Sept. 24, 1963    J. GUITTON ETAL    3,105,149
GEOPHYSICAL PROSPECTING DEVICE FOR
IDENTIFYING RADIOACTIVE ELEMENTS
Filed April 6, 1960
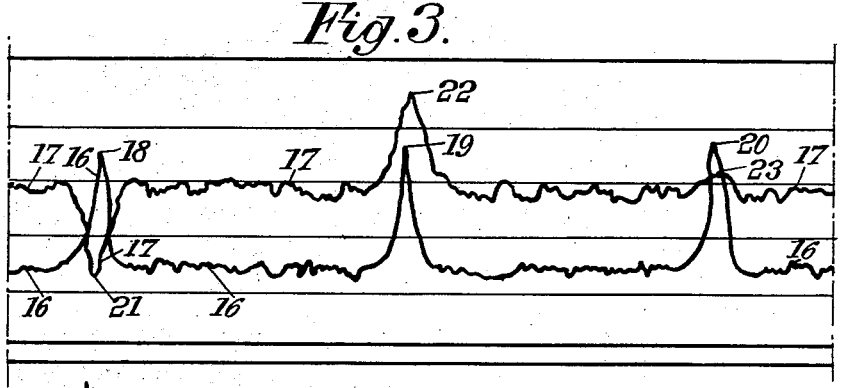
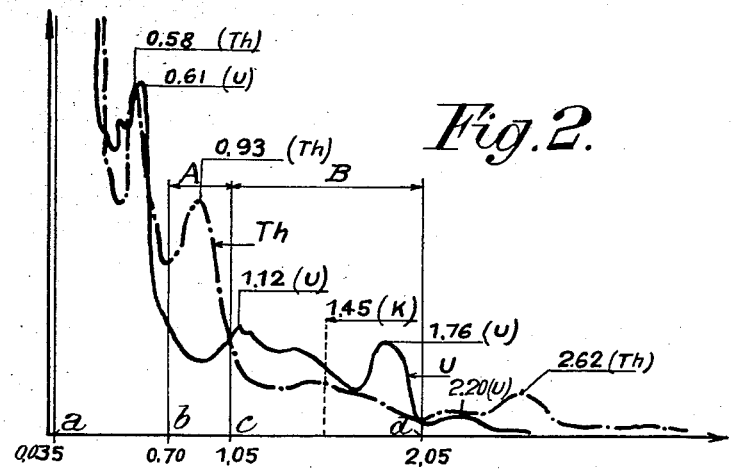
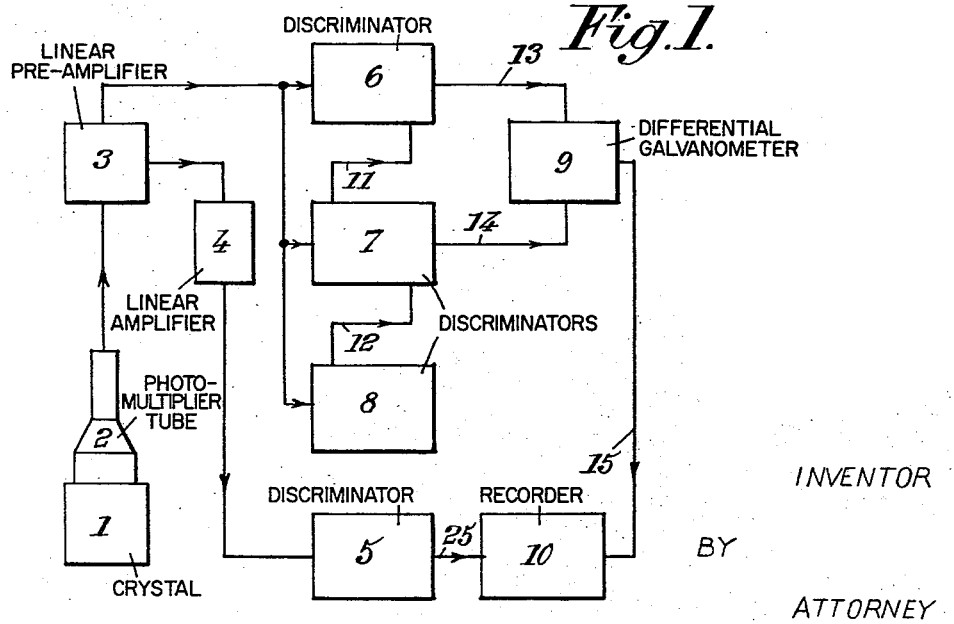
INVENTOR
BY
ATTORNEY United States Patent Office 3,105,149
Patented Sept. 24, 1963

3,105,149
GEOPHYSICAL PROSPECTING DEVICE FOR IDENTIFYING RADIOACTIVE ELEMENTS
Jean Guitton, Versailles, and Claude Lallemant, Paris, France, assignors to Commissariat a l'Energie Atomique, Paris, France
Filed Apr. 6, 1960, Ser. No. 20,358
Claims priority, application France Apr. 10, 1959
7 Claims. (Cl. 250—71.5)

The present invention relates to devices for detecting and identifying radioactive elements, either natural or artificial, which emit gamma rays, in particular for the geophysical prospection of various substances. Among these substances are radioactive ores (such as uranium, radium and thorium ores, for instance), petroleum and natural gases (detectable by means of the radioactive rock zone that surrounds them), and the like. Although the device according to this invention is especially suitable for aerial prospecting, it may also be used for land prospecting, either above or below the surface of the ground.

There are known prospecting devices, based upon the detection and identification of gamma ray emissive radioactive elements, which comprise a radioactivity detector of the scintillation type (i.e. including a scintillator cooperating with a photomultiplier tube and a pre-amplifier) which delivers electrical pulses of an amplitude depending upon the energy of the gamma rays impinging thereon, pulse height amplifiers receiving pulses from said detector to deliver, through several output channels, respectively, a total signal of a value corresponding to the whole of the gamma rays having impinged upon the detector and one or several specific or differentiated signals corresponding only to those of said gamma rays that range within one or several relatively narrow energy bands, so that each of the specific signals indicates the presence of one or several gamma ray emissive elements (such as uranium, thorium and potassium), and a recorder which simultaneously records the total signal and the specific signals.

Such devices are described for instance in the French Patent No. 1,123,652, filed February 17, 1955, by the Canadian firm "Lundberg Explorations Limited" and delivered on June 18, 1956.

They permit of detecting a radioactive anomaly by examination of the total signal and of identifying the nature of the anomaly by studying the specific signals. However, it is not always easy for someone who is not an expert in this field to interpret variations of the specific signals, especially when, as it is often the case, identification calls for a comparative examination of at least two specific signals. Furthermore, discrimination of the pulses in relatively narrow bands, corresponding substantially to the characteristic peak tops of the continuous spectra of the different radioactive elements, leads to relatively low counting rates especially for the characteristic band of thorium in which use is made of the energy peak of 2.62 Mev, which corresponds to a counting rate of some counts per second. This is particularly true in the case of aerial prospecting, where the scintillation detectors are located at a relatively great distance from the radioactive element to be detected and move at great speed with respect thereto. Besides, it should be noted that, in the case of aerial prospecting, low counting rates involve a detrimental reduction of the accuracy of counting because it is not possible to reduce the influence of statistic fluctuations by making use of a high integration constant which would result in the disappearance of the local variations of radioactivity when flying at high speed above the land to be prospected.

There are also prospecting devices which include several radioactivity detectors having different respective sensitivities with respect to the various nuclear radiations, which permits of eliminating amplitude selectors and low counting rates. But such devices are liable to get easily out of order due to the use of several independent detectors.

The chief object of our invention is to provide a device which facilitates prospecting, in particular aerial prospecting, due to the fact that it is very simple and easy to adjust owing to the use of a single detector and of pulse-height analyzing and selecting means determining wide energy bands, while being very selective and adapted to be used by persons who are not specialized in this field of engineering since the signals are treated by an electrical unit (such as a differential galvanometer or a ratiometer) which gives either the difference or the quotient of two signals supplied by the selectors, one of these signals depending essentially upon the presence of a first radioactive element (such as thorium) whereas the other one depends essentially upon the presence of a second radioactive element (such as uranium), the resultant signal delivered by this electrical unit varying in one direction or the other according as radioactivity is due to the presence of either the first or the second of said radioactive elements.

Our invention is therefore concerned with a device for detecting and identifying at least two gamma ray emissive elements, a first one and a second one, each of these elements having a gamma ray continuous spectrum including at least one peak, this device comprising, in combination, a scintillation gamma ray detector capable of delivering, at the output thereof, electrical pulses of an amplitude substantially proportional to the respective energies of the incident gamma rays, a pulse height analyzer having its input connected with the output of said detector, said analyzer having at least three output channels and being adjusted to supply, through the first of said output channels, a first current which is an increasing function of the number of output pulses from said detector having amplitudes corresponding to gamma ray energies ranging in a first band within which at least one complete peak of the gamma ray spectrum of said first element is above the gamma ray spectrum of said second element, said analyzer being further adjusted to supply, through the second of said output channels, a second current which is an increasing function of the number of output pulses from said detector having amplitudes corresponding to gamma ray energies ranging in a second band within which at least one complete peak of the gamma ray spectrum of said second element is above the gamma ray spectrum of said first element, said analyzer being further adjusted to supply, through the third of said output channels, a third current which is an increasing function of the number of output pulses from said detector having amplitudes higher than the upper limit amplitude of the parasitic pulses delivered by said detector, an electrical unit having two inputs respectively connected with said first and second output channels and capable of delivering, at its output, a fourth current which is a decreasing function of said first current and an increasing function of said second current, and a dual track recording apparatus connected respectively with said unit output and with said third output channel to give two parallel records of said third and fourth currents.

The device according to our invention therefore permits of obtaining on a single record, for instance on a paper strip, two curves traced simultaneously and which give, as a function of time (therefore as a function of the path travelled over by the aircraft above the land to be prospected), on the one hand, the variations of a signal which depends upon the total radioactivity and therefore permits detection and, on the other hand, the variations of a signal identifying the preponderating gamma ray emissive element.

A radioactive anomaly is therefore indicated on the first curve by an increase of the total signal whereas examination of the second curve, at the place of this anomaly, permits of identifying the preponderating element according to the direction of the identification signal, the amplitude of this last mentioned signal giving a useful indication concerning the relative percentage of the preponderating radioactive element.

A preferred embodiment of the present invention will be hereinafter described with reference to the accompanying drawing, given merely by way of example and in which:

FIG. 1 diagrammatically shows a detecting and identifying device according to the present invention.

FIG. 2 shows the curves illustrating the energy spectra of two ores, respectively a uranium ore (in solid lines) and a thorium ore (in dot-and-dash lines) and the two wide bands chosen according to the invention for detecting thorium and uranium respectively.

FIG. 3 shows a recording obtained with the device of FIG. 1, making use of the wide bands shown by FIG. 2.

The device according to our invention includes (FIG. 1) a single gamma ray detector of the scintillation type comprising a scintillation element 1 selectively sensitive to gamma rays (for instance a monocrystal of potassium iodide activated with thallium and of sufficient dimension for completely absorbing the gamma rays from the radioactive element to be prospected) cooperating with a photo-multiplier tube 2 having a very high gain, the output of which is connected with the input of a linear pre-amplifier 3 of the video-frequency type having a wide pass-band, stabilzed by an important negative feed-back. The current from this pre-amplifier 3 is supplied, on the one hand, to an amplifier 4 (also linear, stable and having a wide pass-band) the output of which is connected with the input of a discriminating and integrating device 5 for the total counting of pulses, having a very low lower threshold $a$ and, on the other hand, with three selective discriminating and integrating devices 6, 7 and 8 the lower thresholds of which have increasing values $b$, $c$ and $d$ respectively. Each of these units 5, 6, 7 and 8 comprises a discriminator, consisting for instance of a Schmitt trigger circuit biased to pass, among the pulses coming to detector 1, 2, only those having an amplitude above the corresponding threshold (advantageously indicated by the corresponding values, in mev., of the energies of the incident gamma rays) and an integrator consisting of a circuit including a resistance and a capacity which integrates the pulses that have passed through the discriminator so as to supply a current of an amplitude proportional to the number of these pulses (such a circuit gives in fact the mean of the pulses received during a time period which depends upon the ratio of the resistance to the capacity, these factors being generally adjustable).

The output 12 of discriminator 8 is connected in anti-coincidence fashion with discriminator 7 to constitute first pulse-height selecting means, whereas an output 11 of said discriminator 7 is connected in anti-coincidence fashion with discriminator 6 to constitute second pulse-height selecting means, so as to determine by said first and second pulse-height selecting means two channels or bands of pulses (A between thresholds $b$ and $c$ and B between thresholds $c$ and $d$) flowing through output channels 13 and 14 respectively, which both lead to an electrical unit 9 consisting for instance of a differential galvanometer responsive to the difference between the currents fed through chennels 13 and 14 or of a ratio-meter responsive to the value of the ratio of these two currents to each other.

The resultant signal, which increases with the number of pulses in one of the bands and decreases when the number of pulses in the other band increases is fed through line 15 to one intake of a recording apparatus 10, while the total signal supplied by the discriminating and integrating unit 5 is fed through line 25, to another intake of said recording device 10.

Scintillation detectors, stable linear pre-amplifiers and amplifiers having large band-width, discriminating and integrating devices with anti-coincidence interconnections, differential galvanometers, ratio-meters and recording apparatus are well known to those skilled in the art.

In particular, information can be found:

Concerning scintillation detectors and the electronic circuits associated therewith (pre-amplifiers, amplifiers, discriminators, integrators) in the issues of July 1956 (pp. 99–134) and July–October 1959 (pp. 277–294) of Acta Electronica (a review published by the "Laboratoires d'Electronique et de Physique Appliquée," 23, rue du Retrait, Paris (Seine) France), in the issues of April 1956 (pp. 33–64), January 1958 (pp. 54–62) and June 1959 (pp. 63–85) of the "Nucleonics" review (published by McGraw-Hill, New York), and also in the handbooks of Cork "Radioactivity and Nuclear Physics" (Van Nostrand Co., New York, 1957) pp. 72–76 and of Sharpe and Taylor "Mesure et Détection des Rayonnements Nucléaires" (Dunod, Paris, 1958);

Concerning discriminators and anti-coincidence circuits in the U.S. Patents No. 2,529,666 to Sands issued on November 14, 1950 and No. 2,686,266 to Pringle, Roulston and Brownell issued on August 10, 1954; and Concerning differential galvanometers and ratio-meters in handbooks relative to electrical measurements.

As above indicated, one of the chief characteristics of our invention lies in the choice, for defining the identification channels, of wide energy bands. The number of electrical pulses per second is then sufficient in each channel to give a low value of the errors in counting with a minimum integration time constant. FIG. 2 shows how this choice can be made so that the elements to be identified produce clearly differentiated effects. On FIG. 2, we have shown in solid lines the energy spectrum of pitchblende (uranium ore) and in dot-and-dash lines the energy spectrum of monazite (thorium ore), the number of pulses per second at the output of the detector being plotted in ordinates whereas the gamma ray energies, counted in mev., are plotted in abscissas. The band A which was chosen for identifying thorium ranges from abscissa $b$ (0.70 mev.) to abscissa $c$ (1.05 mev.). It comprises one characteristic peak having its top at abscissa 0.93 mev. (the term "peak" is used to designate the portion of the curve which includes one rising portion, the peak top and the consecutive falling portion). In this band A, the above mentioned peak has all of its points located above the pitchblende spectrum (in solid lines). The band B chosen for identifying uranium ranges from abscissa $c$ (1.05 mev.) to abscissa $d$ (2.05 mev.). It comprises two characteristic peaks, one having its top at abscissa 1.12 and the other having its top at abscissa 1.76. Within band B, the curve showing the spectrum of pitchblende has all of its points located above the curve showing the monazite spectrum (in dot-and-dash lines).

The channel corresponding to thorium, shown at 13 on FIG. 1, therefore corresponds to the integration of the signals ranging from 0.70 to 1.05 mev., that is to say to band A, the limits of this channel being constituted by the 0.70 mev. threshold of the discriminating and integrating device 6 and by the 1.05 mev. threshold of the discriminating and integrating device 7. Likewise, the "uranium" channel shown at 14 on FIG. 1 is defined by the 1.05 mev. threshold of discriminating and integrating device 7 and by the 2.05 mev. threshold of discriminating and integrating device 8, thus corresponding to band B of FIG. 2.

The diagram of FIG. 2 also shows a vertical line having an abscissa below 0.2 mev., for instance equal to 0.035 mev., as shown at $a$. This vertical line corresponds to the threshold of the discriminating and integrating device 5 which sends through line 25 a gamma ray total counting signal to recording apparatus 10, the parasitic pulses being eliminated. Thus, finally, the recording apparatus simultaneously traces, along two respective tracks, a detection curve corresponding to the total signal fed through line 25 and an identification curve corresponding to the identification signal fed through line 15 and which is a function of either the difference between the frequency of the gamma rays within band A and that of the gamma rays within band B or of the ratio of these two frequencies to each other.

In the absence of any radioactive anomaly, recording apparatus 10 traces two curves which are substantially parallel straight lines, one of them corresponding to the total counting by means of discriminator 5 and the other to the identification signal of electrical unit 9. If there is a radioactive anomaly due to the presence of uranium, both of the bands 13 and 14 have their respective counting rates increased but the "uranium" channel, which corresponds to band B of FIG. 2, has a higher response than the "thorium" channel. The identification signal from unit 9 therefore shows a peak in a given direction, this peak being visible on the identification curve traced by recording apparatus 10. If the radioactive anomaly is due to the presence of thorium, the response is higher in the "thorium" channel corresponding to band A of FIG. 2 and the identification curve shows a peak extending in the opposite direction with respect to that above mentioned. In both cases, the total counting curve shows a peak corresponding to the radioactive anomaly.

FIG. 3 shows an example of recording obtained in apparatus 10 after the device according to FIG. 1 has been flown above the land to be prospected. The total counting curve is shown at 16 and the identification curve at 17. The total counting curve comprises three peaks 18, 19 and 20 corresponding to three radioactive anomalies. If it is supposed that identification unit 9 is adjusted in such manner that a rise of the counting rate in the "uranium" channel (band B) is indicated by an upward peak in identification curve 17 and that a rise of the counting rate in the "thorium" channel (band A) is indicated by a downward peak, interpretation of the radioactive anomalies that are detected is effected easily and quickly. For instance, to peak 18 of curve 16, there corresponds a downward peak 21 of curve 17. This indicates the presence of thorium. To peak 19 of curve 16, there corresponds an upward peak 22 of curve 17. The apparatus has therefore detected the presence of uranium. As for peak 20 of curve 16, it corresponds to a slight upward peak 23. Peaks 19 and 20 being of approximately equal amplitudes, it is deduced that peak 23 is due to the simultaneous presence of thorium and uranium, the amount of uranium being slightly greater since the peak is directly upwardly.

With a device according to our invention, for a given number of gamma ray emissive elements, the number of curves to be recorded is reduced, which facilitates their interpretation, sensitivity of detection being increased by the choice of wide identification energy bands.

On the other hand, the choice of energy bands as above defined permits of complying with the actual conditions of use in the field because the rate of counting is compatible with the speed of aerial scanning. Furthermore this choice involves a stability of the threshold which is particularly interesting in the case of a device which is to work under rather hard conditions of temperature, shocks, more or less regular feed voltage, and so on.

The invention could be applied to the case where the number of radioactive elements to be detected and identified is greater than 2.

In a general manner, while we have, in the above description, disclosed what we deem to be a practical and efficient embodiment of our invention, it should be well understood that we do not wish to be limited thereto as there might be changes made in the arrangement, disposition and form of the parts without departing from the principle of the present invention as comprehended within the scope of the accompanying claims.

What we claim is:

1. A device for detecting and identifying at least two gamma ray emissive elements, a first one and a second one, each of these elements having a gamma ray continuous spectrum including at least one peak, which device comprises, in combination, a scintillation gamma ray detector capable of delivering, at the output thereof, electrical pulses of an amplitude substantially proportional to the respective energies of the incident gamma rays, pulse-height analyzing and selecting means having its input connected with the output of said detector, said pulse-height analyzing and selecting means having at least three output channels and being adjusted to supply, through the first of said output channels, a first current which is an increasing function of the number of output pulses from said detector having amplitudes corresponding to gamma ray energies ranging in a first band within which the gamma ray spectrum of said first element is always above the gamma ray spectrum of said second element, through the second of said output channels, a second current which is an increasing function of the number of output pulses from said detector having amplitudes corresponding to gamma ray energies ranging in a second band within which the gamma ray spectrum of said second element is always above the gamma ray spectrum of said first element, through the third of said output channels, a third current which is an increasing function of the number of output pulses from said detector having amplitudes higher than the upper limit amplitude of the parasitic pulses delivered by said detector, an electrical unit having two inputs respectively connected with said first and second output channels and capable of delivering, at its output, a fourth current which is a decreasing function of said first current and an increasing function of said second current, and a dual track recording apparatus connected respectively with said unit output and with said third output channel to give two parallel records of said third and fourth currents.

2. A device according to claim 1, in which said first element is thorium and said second element is uranium, said first band ranging approximately from 0.7 to 1 mev. and said second band ranging approximately from 1 to 2 mev., the amplitude of said upper limit of the parasitic pulses being 0.2 mev.

3. A device according to claim 1, in which said electrical unit is a differential galvanometer arranged to subtract said first current from said second current to obtain said fourth current.

4. A device according to claim 1, in which said electrical unit is a ratio-meter which divides said second current by said first current to give said fourth current.

5. A device according to claim 1, in which the surface comprised between the gamma ray spectrum of said first element and the gamma ray spectrum of said second element for the energies ranging in said first band is substantially equal to the surface comprised between the gamma ray spectrum of said second element and the gamma ray spectrum of said first element for the energies ranging in said second band.

6. A device for detecting and identifying thorium and uranium comprising, in combination, a scintillation gamma ray detector capable of delivering, at the output thereof, electrical pulses of an amplitude substantially proportional to the respective energies of the incident gamma ray, pulse-height analyzing means having an input connected to the output of said detector and at least four outputs, said pulse-height analyzing means being adjusted to supply on said four outputs a first, second, third and fourth output signal which are increasing functions of the number of output pulses from said detector having amplitudes higher than the upper limit amplitude of the parasitic pulses delivered by said detector for the first signal, the amplitude corresponding to a gamma ray energy of approximately 0.7 mev. for the second signal, the amplitude corresponding to a gamma ray energy of approximately 1 mev. for the third signal and the amplitude corresponding to a gamma ray energy of approximately 2 mev. for the fourth signal respectively, anti-coincidence pulse-height selecting means connected to said pulse-height analyzing means comparing said second and said third signal to supply a first current representative of the number of output pulses from said detector having amplitudes corresponding to gamma ray energies in a first band substantially between 0.7 mev. and 1 mev. and comparing said fourth and said third signal to supply a second current representative of the number of output pulses from said detector having amplitudes corresponding to gamma ray energies in a second band substantially between 1 mev. and 2 mev., whereas said first signal is directly delivered on the first output of said pulse-height analyzing means as a third current representative of the number of output pulses having amplitudes higher than said parasitic pulses, an electrical unit connected to said pulse-height selecting means for delivering on its output a fourth current which is a decreasing function of said first current and an increasing function of said second current, and a dual track recording apparatus connected respectively with said unit output and said pulse-height analyzing means first output to give two parallel records of said third and fourth currents.

7. In a device for detecting and identifying at least two gamma ray emissive elements, a first one and a second one, each of these elements having a gamma ray continuous spectrum, which device comprises, in combination, a scintillation gamma ray detector capable of delivering, at the output thereof, electrical pulses of an amplitude substantially psoportional to the respective energies of the incident gamma rays, pulse-height analyzing means having its input connected with the output of said detector, said pulse-height analyzing means having at least four outputs and being adjusted to supply on said outputs four signals, each signal being an increasing function of the output pulses from said detector having an amplitude higher than a given limit amplitude, the limit amplitude for the second signal being higher than the limit amplitude for the first signal, the limit amplitude for the third signal being higher than the limit amplitude for the second signal and the limit amplitude for the fourth signal being higher than the limit amplitude for the third signal, the improvement consisting in further provided pulse-height selecting means connected to said pulse-height analyzing means for comparing the second to the third signal and the third to the fourth signal, the assembly of said pulse-height analyzing and selecting means having at least three output channels and being adjusted to supply, through the first of said output channels, a first current which is an increasing function of the number of output pulses from said detector having amplitudes corresponding to gamma ray energies ranging in a first band within which the gamma ray spectrum of said first element is always above the gamma ray spectrum of said second element, through the second of said output channels a second current which is an increasing function of the number of output pulses from said detector having amplitudes corresponding to gamma ray energies ranging in a second band within which the gamma ray spectrum of said second element is always above the gamma ray spectrum of said first element, through the third of said output channels a third current which is an increasing function of the number of output pulses from said detector having amplitudes higher than the upper limit amplitude of the parasitic pulses delivered by said detector, an electrical unit having two inputs respectively connected with said first and second output channels and capable of delivering, at its output, a fourth current which is a decreasing function of said first current and an increasing function of said second current, and a dual track recording apparatus connected respectively with said unit output and with said third output channel to give two parallel records of said third and fourth currents.

References Cited in the file of this patent
UNITED STATES PATENTS

| 2,563,333 | Herzog | Aug. 7, 1951 |
| 2,897,368 | Lundberg et al. | July 28, 1959 |